United States Patent [19]

Boirat et al.

[11] Patent Number: 4,653,850

[45] Date of Patent: Mar. 31, 1987

[54] SPACE DIVISION OPTOELECTRONIC SWITCH DEVICE

[75] Inventors: Robert Boirat, Dourdan; Philippe Faugeras, Boulogne-Billancourt; Denis Haux, Etampes; Jacques Mimeur, Veyrier du Lac, all of France

[73] Assignee: Compagnie Industrielle des Telecommunications Cit-Alcatel, France

[21] Appl. No.: 615,449

[22] Filed: May 30, 1984

[30] Foreign Application Priority Data

May 31, 1983 [FR] France ................ 83 08971

[51] Int. Cl.⁴ .............................................. G02B 6/40
[52] U.S. Cl. ............................ 350/96.22; 350/96.15; 350/96.21
[58] Field of Search ............... 250/227; 350/96.15, 350/96.20, 96.21, 96.22, 96.24

[56] References Cited

U.S. PATENT DOCUMENTS

| 3,542,451 | 11/1970 | Washburn | 350/96.24 |
| 3,792,239 | 2/1974 | Ohlhaber | 350/96.24 |
| 3,920,982 | 11/1975 | Harris | 350/96.24 |
| 3,977,762 | 8/1976 | Sandbank | 350/96.24 |
| 4,070,093 | 1/1978 | Schwartz | 350/96.24 |
| 4,444,458 | 4/1984 | Stowe et al. | 350/96.15 |
| 4,528,695 | 7/1985 | Khoe | 350/96.15 |

FOREIGN PATENT DOCUMENTS

| 2523496 | 12/1976 | Fed. Rep. of Germany | 350/96.24 |
| 1125 | 1/1983 | Japan | 350/96.24 |
| 1407544 | 9/1975 | United Kingdom . | |

OTHER PUBLICATIONS

Bloem et al., IBM Tech. Disc. Bull., 16(1), Jun. 1973, "Fiber-Optic Coupler", pp. 146–147.
IEEE Journal of Quantum Electronics, vol. QE-17, No. 8, Aug. 1981, pp. 1539–1546.
(Hara et al.) "A High Speed Optoelectronic Matrix Switch . . . ", National Telecommunications Conference, vol. 2, Nov. 29–Dec. 3, 1981.
(Hara et al.) "Applications of the Optoelectronic Matrix Switch to . . . ".
Young et al., Electronics Letters, vol. 17, No. 16, Aug. 6, 1981, "Cascaded Multipole Switches for Single-Mode and Multimode . . . ", pp. 571–573.

*Primary Examiner*—William L. Sikes
*Assistant Examiner*—Frank González
*Attorney, Agent, or Firm*—Sughrue, Mion, Zinn, Macpeak, and Seas

[57] ABSTRACT

The device comprises, for coupling the accesses of N first elements (fa) with the accesses of N second elements (fp) an distributer assembly (10) constituted by a stack of P flat and rigid distribution plates (11) having N waveguides (h) each coupled to the access of one of the second elements (fp) and a concentrator-selector assembly (20) constituted by a stack of N flat and rigid concentration and selection plates (21) having P waveguides and including an integrated strip (31) of P photodiodes which are coupled to the ends of the P waveguides, said assemblies being assembled to each other to couple the individual waveguides together. It is particularly applicable to optically broadcasting P programs to N subscribers.

10 Claims, 5 Drawing Figures

SPACE DIVISION OPTOELECTRONIC SWITCH DEVICE

The present invention relates to optical transmission. It relates more particularly to a space division optoelectronic switch device for switching between N distinct first elements and P distinct second optical elements. Such a device is used for direct light from the second optical elements towards the first elements. It is particularly applicable to broadcasting P programs from the P second optical elements to each of the the first elements, which, by suitable selective coupling, receives the desired program, and thus constitutes an optical program broadcaster.

BACKGROUND OF THE INVENTION

Generally speaking, an optical system for broadcasting P programs to N subscribers requires N optical fibers for transmitting each of the programs to the N subscribers. The resulting P times N fibers are regrouped into N groups of P fibers each, ie. one group per subscriber, and the desired one of the P fibers in each of the N groups is coupled to the corresponding subscriber's optical fiber to enable the subscriber to receive the desired one one of the P programs made available.

An article entitled "A high speed optoelectronic matrix switch using heterojunction switching diodes" by E. H. Hara et al. published in the IEEE Journal of Quantum Electronics, vol. QE 17, No. 8, August 1981, describes the principle of such an optoelectronic switch device structure.

According to that article, signals are distributed from the second elements by means of optical fibers, while the signals applied individually to the first elements are selected by means of discrete photodiodes.

Preferred embodiments of the present invention provide an optoelectronic switch device which is in modular form and in which the photodiodes used are in the form of integrated strips which are simple to associate with and assemble to the other modular elements.

SUMMARY OF THE INVENTION

The present invention thus provides a space divided optoelectronic switch device for switching between N distinct first elements and P distinct second elements, using optical fiber for transmitting signals from the P second elements towards the N elements, and using photodiodes for selective coupling between the P second elements and the N first elements, the switch comprising:

a distributer assembly having P distribution plates with each distribution plate incorporating N individual waveguides having first ends coupled in common to the second element which associated with the distribution plate in question, and having their other ends referred to as outputs or ends aligned along the side of the distribution plate at a pitch t, and in which the outputs of the waveguides of the various distribution plates are on the same side and are arranged in N rows of P outputs disposed at a pitch r;

a concentrator-selector assembly having N concentration and selection plates in which each of the N concentration and selection plates firstly has a first side bearing an integrated strip of P photodiodes whose individual outputs are coupled in common to ends of one of the first elements which is associated with the concentration and selection plate in question, and secondly incorporates P waveguides that fan out from said first side of the concentration and selection plate where they have first ends which are distinct but close together at the pitch of the said photodiodes and which are coupled to said photodiodes, to the opposite side where they have distinct second ends which are aligned and disposed at the pitch r of the outputs of each of the said N rows of the distributer assembly, and in which the second ends of the guides of the concentration and selection plates are disposed on the same side;

and wherein the said distributer assembly and the said concentrator-selector assembly are assembled to each other with the concentration and selection plates being orthogonally disposed across the distribution plates and the outputs or ends of each of the N rows of the latter assembly being coupled to the second ends of the waveguides of each of the concentration and selection plates.

BRIEF DESCRIPTION OF THE DRAWINGS

The invention is described with reference to the accompanying drawings, which show an embodiment of a device for broadcasting a plurality of programs to several subscribers. In the drawings.

MORE DETAILED DESCRIPTION

Figure 1:
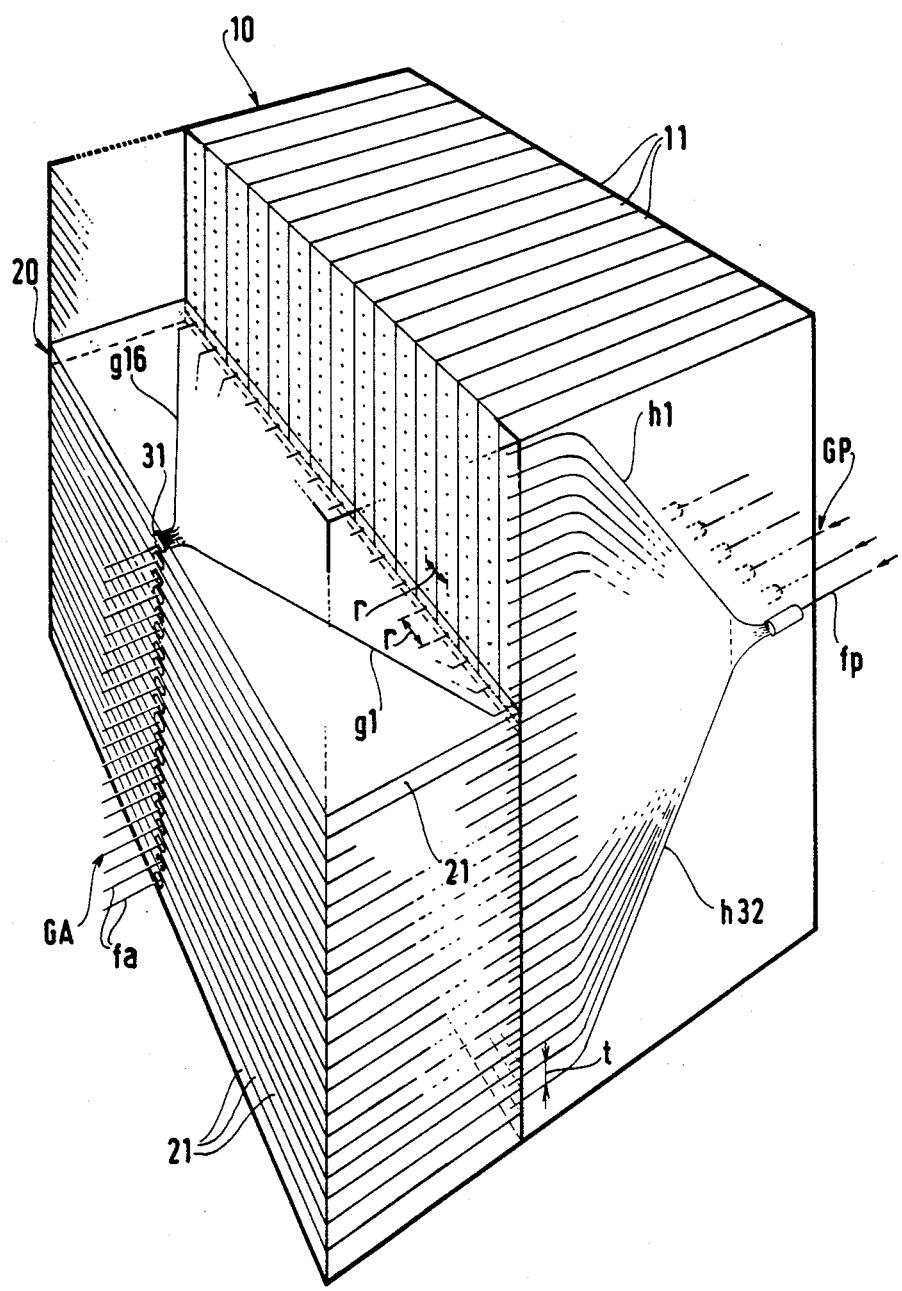
FIG. 1 is a diagrammatic representation of a space-divided optoelectronic switch device in accordance with the invention.

In FIG. 1, an optoelectronic switch device in accordance with the invention is shown diagrammatically in an application for broadcasting P programs from a group GP of P distinct optical fibers, referred to as program fibers fp, to N subscribers having a group GA of N distinct optical fibers attributed thereto, said fibers being referred to as subscriber fibers fa. The device is described in a context where there are 16 programs for broadcasting to 32 subscribers, ie. P=16 and N=32. The device is referred to as an optical broadcaster.

The device includes a distributer assembly 10 coupled to 16 program fibers fp and a geometrical concentrator and selector assembly 20 referred to hereinafter more shortly as a concentrator-selector, and coupled to the distributer assembly 10 and to 32 subscriber fibers fa.

The distributer assembly 10 is constituted by a stack of 16 optical program distribution plates 11, each associated with one of the program fibers fp. The distribution plates 11 are identical to one another. Each of the plates is rigid and flat, and incorporates 32 individual waveguides or elements h1 to h32. On one of its faces it has a common access coupling 33 for coupling these 32 waveguides to the program fiber fp associated therewith, and on an opposite face it has 32 distinct distribution outputs or ends for the program at a regular pitch t. In the distributer assembly 10 the distribution output of the different plates are on the same side, and constitute 32 rows of 16 distribution outputs, each output in a row distributing one of the 16 programs and the outputs along a row being disposed at a pitch r.

The concentrator-selector assembly 20 is constituted by another stack of 32 concentration and selection plates 21, each being associated with one of the subscriber fibers fa. The concentration and selection plates 21 are identical to one another. Each of them is rigid and incorporates 16 individual waveguides V or elements g1 to g16 together with an integrated strip 31 of 16 photodiodes.

The 16 waveguides g1 to g16 in each of the concentration and selection plates 21 fan out from one of the faces of the plate, at which face they have respective distinct first ends brought close together along a line at a very small spacing (not visible in FIG. 1) of about 100 μm. The waveguides also have distinct second ends which are aligned along a second, opposite face of the plate at the pitch r of the distribution accesses of the various programs along the rows thereof.

The 16 photodiodes, not shown in FIG. 1 because of their very small pitch of about 100 μm and thus because of their very small overall size, are connected to respective ones of the first ends of the 16 waveguides in the plate 21. The integrated photodiode strip 31 is fixed to the first face of the plate by glue with the individual photodiodes of the strip connected to respective first ends of the waveguides g.

The photodiode strips 31 of the various concentration and selection plates 21 are on the same side of the concentrator-selector assembly 20 while the second ends of the waveguides are on the opposite side of the selector assembly.

The concentrator-selector assembly 20 and the distributer assembly 10 are assembled to each other with the 32 concentration and selection plates 21 and the 16 distribution plates 11 disposed orthogonally so that the distribution ends of each row are disposed opposite to respective second ends of the waveguides g in the plates 21.

Each of the integrated strips of photodiodes 31 has an electrical output which is common to the photodiodes of the strip. This common output is coupled to the subscriber fiber fa associated with the concentration and selection plate 21 by a light emitting diode (LED), not shown.

In a variant, the first elements associated with the subscribers are not optical fibers, but are electrical conductors. In which case, the each photodiode strip has its common output connected to the corresponding subscriber conductor.

In another variant, the P second elements coupled to the waveguides of the respective P distribution plates (and constituted in the present example by program fibers fp) could be program-emitting light sources, with each source being constituted by a laser-diode for example, or more advantageously, by a plurality of laser-diodes all emitting the same program since this configuration has the advantage (in addition to greater reliability) of reducing mode noise by superposing different modes from lasers.

As shown in FIG. 1 it will be understood that the different photodiodes in each strip 31 are individually controlled by the subscriber with which they are associated so that just one of the diodes is used to convey the program being transmitted over the single waveguide g to which it is coupled. Different subscribers will apply different controls to different strips. As a result, each subscriber can select a desired program from the programs being transmitted and a plurality of subscribers can receive the same program at the same time.

Figure 2:
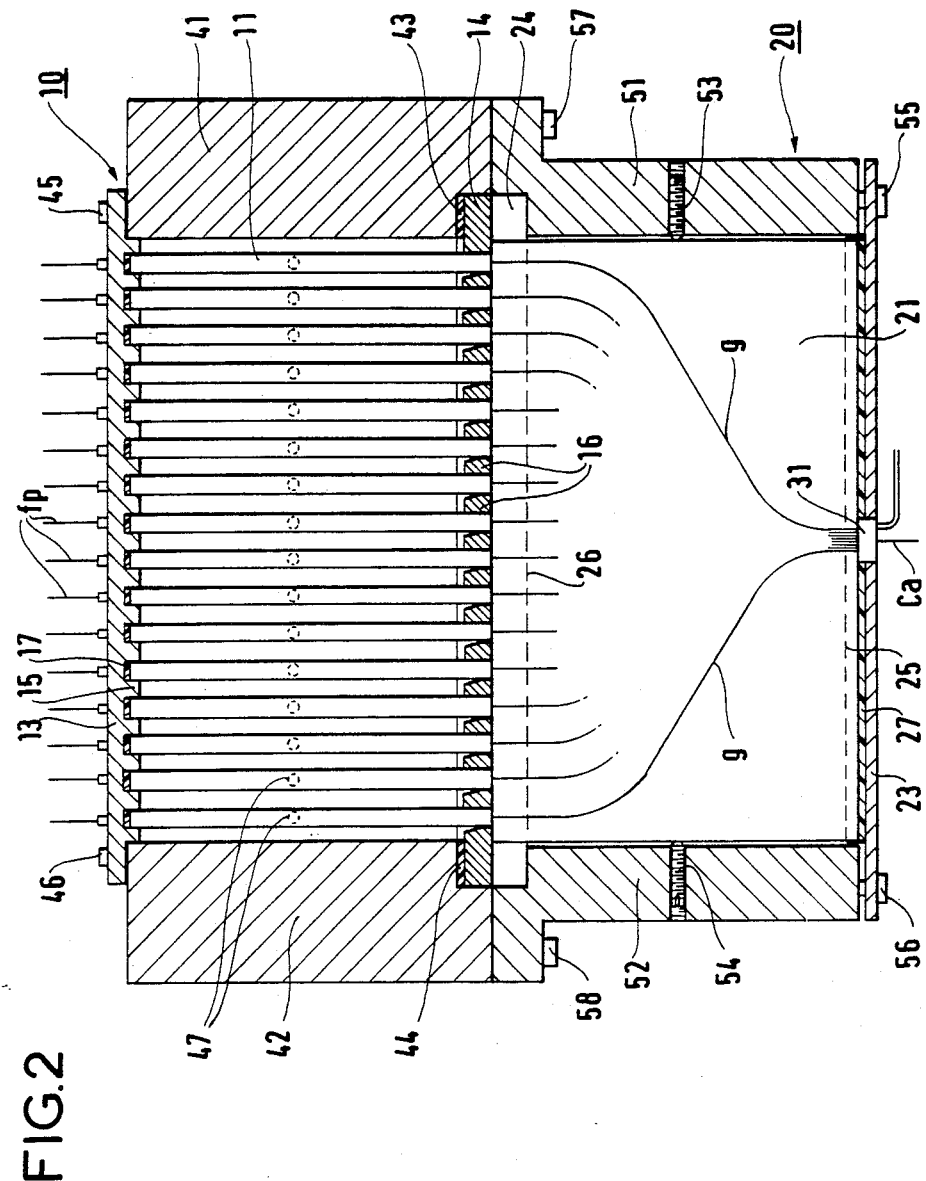
FIG. 2 is a sectional view which shows a concrete embodiment of the FIG. 1 switch device.

FIG. 2 shows one concrete embodiment of an optoelectronic diffuser corresponding to that shown in FIG. 1. Items which are identical in both figures have the same reference numerals.

The stack of 16 program distribution plates 11 constituting the distributer assembly 10 is held between two positioning plates or grids 13 and 14. These grids 13 and 14 have respective sets of ribs 15 and 16 with the ribs of each grid extending towards the ribs of the other, and with the waveguide access sides of the distribution plates 11 being received between the ribs.

The ribs 15 are of rectangular section, and they receive the sides of the plates which have the common accesses coupling 33 for coupling the waveguides to the program fibers fp. A window is provided in the bottom of each of the grooves between adjacent ribs to enable each of the fibers fp be coupled to their associated waveguides. The grid 13 further includes resilient tongues 17 at the bottoms of the grooves between the ribs 15 for play-free positioning of the plates 11 against the grid and in the resulting distributor assembly 10.

The ribs 16 have chamfered edges so that they can receive the sides of each plate 11 having the program outputs or ends in a manner which ensures firm and accurate positioning of the said sides, and thus of the various plates 11. The grooves between the ribs 16 are open bottomed so that the side of each plate 11 can be situated in the plane of the plane face of the grid 14.

Two side blocks 41 and 42 which may form part of a frame surrounding the resulting stack, serve to interconnect the two grids 13 and 14, with the edges of the grid 14 being received in recesses provided for the purpose in the inside faces of the side blocks, and with the bottoms of the recesses being lined with rubber 43, 44. The grids are fixed to the side blocks by screws such as 45 and 46.

The stack of 32 concentration and selection plates 21 is constituted in an analogous manner on two grids 23 and 24 which are similar to the above-mentioned grids 13 and 14. The grid 23 has ribs 25 of rectangular section and the grooves delimited between the ribs have resilient tongues 27 at their bottoms. These grooves receive the sides of the plates 21 on which the photodiode strips 31 are mounted. The grid 24 has ribs 26 with a chamfered edge on each rib, and with the grooves between these ribs receiving the sides of the plates on which there are the second ends of the waveguides g.

Two side blocks 51 and 52 which may form part of a frame surrounding the resulting stack serves to interconnect the two grids 23 and 24. The opposite sides of the grid 24 which are disposed transversely to the plates 21 are lodged in respective recesses provided in the inside faces of the side blocks 51 and 52. Screws such as 55 and 56 fix the grids to the side blocks 51 and 52. Each of the strips 31 of photodiodes coupled to the waveguides g is received in the thickness of the grid 23 which has a suitable window provided for the purpose. The electrical outputs Ca from the various strips leave the concentrator-selector assembly 20.

Each of the stack assemblies thus constituted has pairs of adjusting screws such as 47 for the distributer assembly 10 and 53, 54 for the concentrator-selector assembly 20 to act on those sides of the individual plates which are free from accesses or ends of the waveguides therein.

These two assemblies 10 and 20 are assembled to each other to constitute the final optoelectronic device by means of screws such as 57 and 58 which interconnect the side blocks of the two parts.

Figure 3:
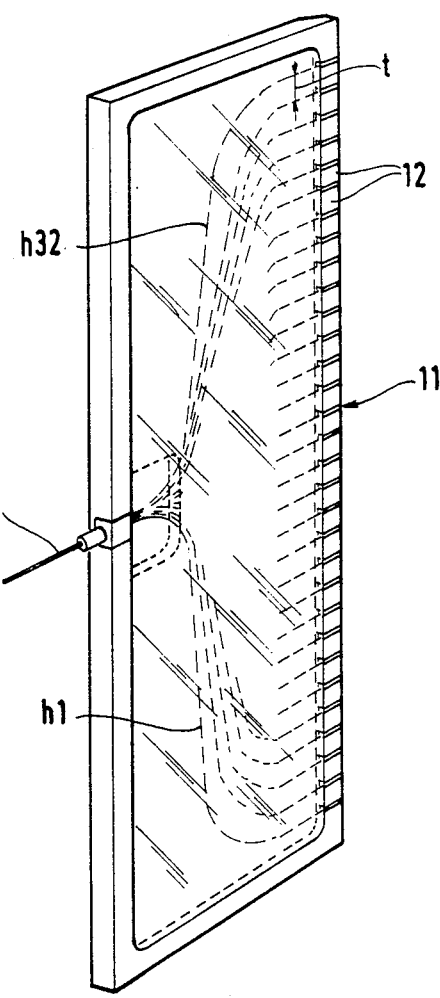
FIG. 3 is a perspective view which shows one of the modular elements used in the FIG. 2 device.

FIG. 3 shows an embodiment of a program distribution plate 11 suitable for use in the assemblies described with reference to FIGS. 1 and 2. This plate 11 includes the 32 individual waveguides h1 to h32 shown in FIG. 1. These 32 waveguides have first ends brought together on one side to constitute the common access for coupling the 32 waveguides h to the program fiber fp associated with the plate 11. The 32 waveguides fan out from said side at which they are coupled in common with the fiber fp to the opposite side where their second ends are distinct and form multiple outlets or ends for the same program disposed at a pitch t along the side. In addition the plate 11 includes a peripheral frame 12, made of aluminum alloy for example, to facilitate its mechanical assembly in the above-described distributer assembly.

The distribution plate may be made as an integrated structure by creating the waveguides h by ion diffusion in a plate of glass. This method is described, for example, in the article entitled "Planar multimode devices for fiber optics" by G. L. Tangonan et al. presented to the Optical Communication Conference, Amsterdam, Sept. 17-19, 1979, or in the article entitled "Fast fabrication method for thick and highly multimodal Optical Waveguides" by G. H. Chartier et al. published in Electronics Letters, Vol. 13, No 25, dated Dec. 8, 1977.

The plate 11 may also be obtained by embedding individual optical fibers constituting the waveguides h in silica-impregnated epoxy resin or in glass having a melting point of about 500° C. and a low coefficient of thermal expansion to reduce stresses on cooling. In these modes of fabrication, common length of fiber of greater cross section than the individual waveguides is used in addition to the waveguide fibers for coupling to all 32 individual fibers h at one end where said individual fibers are brought together into a hexagonally packed bundle, and for coupling to the fiber fp at the other end, thereby constituting a common coupling 33 for the 32 fibers h. The distinct ends of the waveguides h and the end of the additional common fiber are initially prepositioned and glued to the frame 12, and after the filler material has been cast round the fibers, the sides of the frame are rectified and polished.

Figure 4:
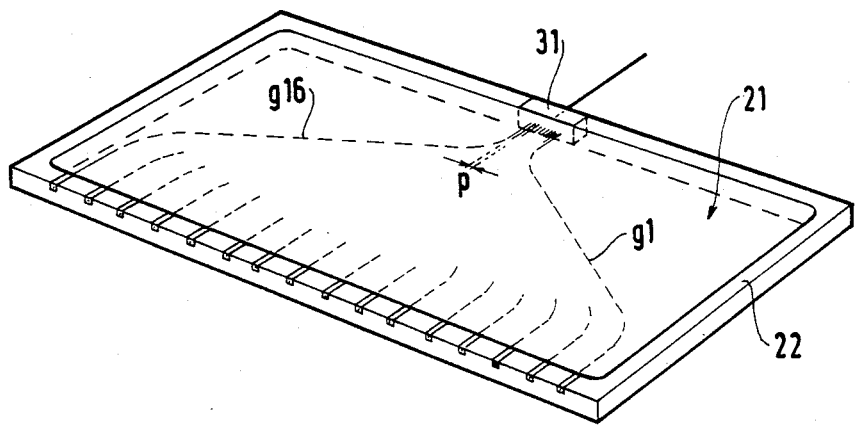
FIG. 4 is a perspective view which shows the other modular element used in the FIG. 2 device.

FIG. 4 shows an embodiment of a concentration and selection plate 21 suitable for use in an assembly as described with reference to FIGS. 1 and 2. The plate 21 incorporates 16 individual waveguides g1 to g16 and has an integrated strip of photodiodes 31 suitably fixed to its side. The waveguides g1 to g16 extend inside the plate from one of its sides where their widely separated ends are at a pitch r to the opposite side where their other ends are grouped together but remain distinct at a small pitch p which matches the pitch of the photodiodes in the integrated strip 31. The strip 31 of photodiodes 31 in which the photodiodes are at the pitch p is glued to the side of the plate 21 opposite to these ends of the waveguides g.

The plate 21 also comprises, in addition a peripheral frame 22 for its mechanical mounting in the above-described concentrator-selector assembly.

The concentration and selection plate 21 may be fabricated in a manner analogous to the distribution plate as an integrated structure or on the basis of individual fibers constituting the waveguides and embedded in a matrix cast over them. In the case of individual fiber guides, the frame 22 acts as a reference frame for prepositioning individual fibers and its sides with the fiber ends will subsequently be rectified and polished. The photodiode strip 31 is then suitably applied to the frame and glued thereto.

Figure 5:
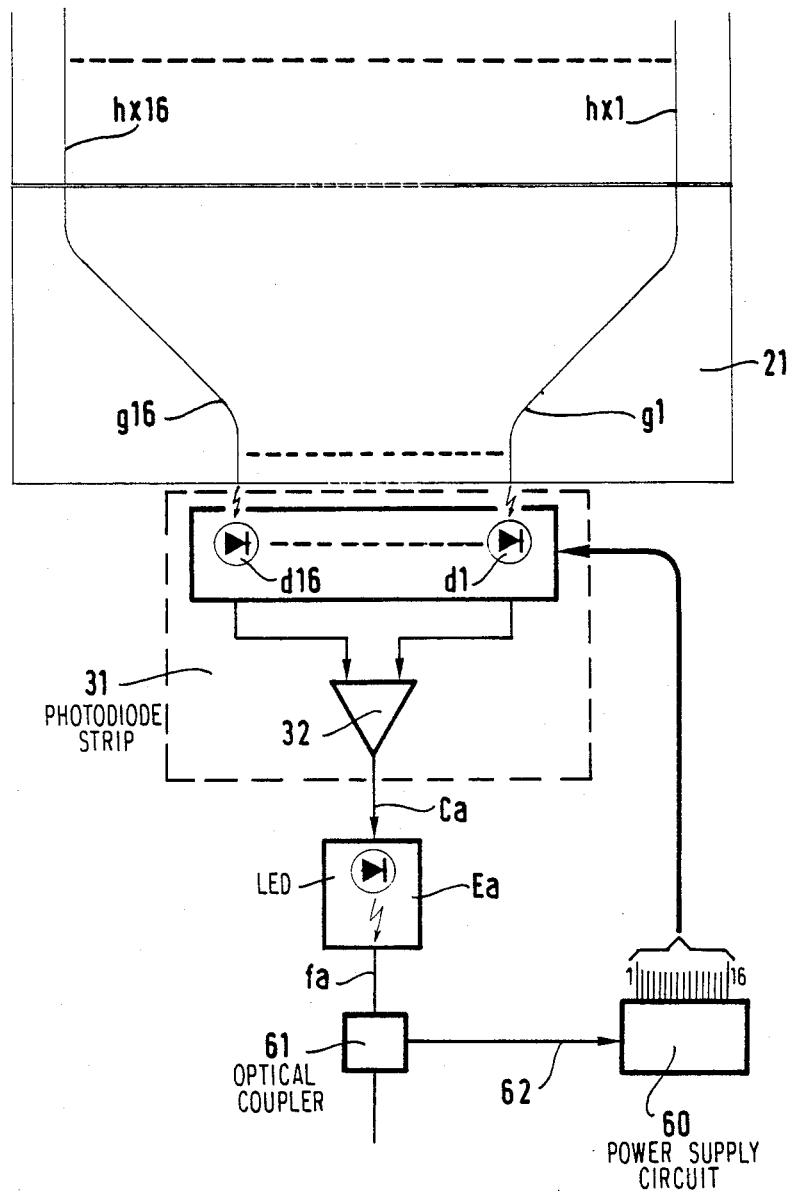
FIG. 5 is a combined circuit diagram and plan view of the second modular element shown in FIG. 4, together with its coupling to a subscriber fiber and the selective control of power application to one of the photodiodes therein.

FIG. 5 is an optoelectronic circuit diagram of one of the concentration and selection plates 21. References hx1 to hx16 designate the x-th waveguide in each of the distribution plates providing output for the 16 different programs, which outputs are arranged in a row corresponding to the concentration and selection plate shown in the figure. The reference 21 indicates concentration plate per se with 16 waveguides g1 to g16 which each have a first end coupled to a respective one of the ends of the waveguides hx1 to hx16, and which each have a second end coupled to a respective one of the photodiodes d1 to d16 in the integrated strip 31 mounted thereon. The outputs of the diodes in the strip 31 are connected to an amplifier 32 which provides the sole output Ca from the strip 31 as a whole. A light-emitting diode (LED) Ea couples the output Ca to the subscriber fiber fa.

The photodiodes d1 to d16 have their individual power supplies coming from a circuit 60 and an optical coupler 61 is inserted on the subscriber fiber fa to enable a selected one of the photodiodes in the strip to be powered, thereby enabling the corresponding subscriber to select one of the programs transmitted via the waveguides g. The optical coupler 61 is of conventional type and provides continuity of transmission of the selected program over the fiber fa while also enabling the program to be selected from the subscriber fiber. It may comprise, for example, a semitransparent mirror interposed between a focusing lens and a collimating lens. The selection signal from the subscriber is transmitted via the coupler 61 over a link 62 to the photodiode power supply control circuit, and after detection by means not shown, the received control signal causes a selected one of the photodiodes to be powered.

We claim:

1. A space division optoelectronic switch device for selectively coupling any one of N first optical elements to P second optical elements, said switch device comprising:

a distributor assembly comprising a plurality of P stacked distribution plates each corresponding to a respective one of said second optical elements with each distribution plate including a plurality of N individual waveguides having first ends coupled in common to a respective one of said second optical elements and having output ends aligned along a side of the distribution plate at a pitch t, and wherein said stacked distribution plates have the output ends of the waveguides of the various distribution plates arranged in N rows of P outputs disposed at a pitch r:

a concentrator-selector assembly comprising a plurality of N stacked concentration and selection plates each having a first side bearing an integrated strip of P photodiodes having individual outputs and P waveguides having first ends which are distinct but close together at the pitch of said photodiodes and being coupled to said photodiodes, said P waveguides fanning out from said first side of the concentration and selection plate to the opposite side and having distinct second ends aligned and disposed at the pitch r of the outputs of each of said N rows of waveguides of the distributor assembly;

and wherein the stacked plates of said distributor assembly and said concentrator-selector assembly are assembled with the sides of the distribution plates orthogonal to the sides of the concentration and selection plates such that the concentration and selection plates are disposed across the distribution plates and the outputs of each of the N rows of the waveguides of the distributor assembly are coupled to respective second ends of the waveguides of the concentration and selection plates.

2. An optoelectronic switch device according to claim 1, further comprising;

first mechanical means holding and positioning said distribution plates in a stack constituting said distributer assembly, and comprising two first grids having ribs facing each other, the distribution plates being mounted between the ribs, two side blocks mounting the first grids;

second mechanical means holding and positioning the concentration and selection plates in a stack constituting said concentrator-selectro assembly, and comprising two second grids having ribs facing each other, the concentration and selection plates which include the ends of their waveguides being mounted between the second grid ribs, two side blocks mounting the second grids, the strips of photodiodes being lodges in corresponding windows provided in one of the second grids; and assembly means assembling said assemblies to one another with the edges of the plates of one of the assemblies being arranged across the edges of the plates of the other assembly.

3. An optoelectronic switch device according to claim 1, wherein each of the distribution plates includes a peripheral frame for mechanically mounting it in the said distributer assembly.

4. An optoelectronic switch device according to claim 1, wherein each of the concentration and selection plates includes a peripheral frame for mechanically mounting it in the said concentrator-selector assembly.

5. An optoelectronic switch device according to claim 1, wherein each of the distribution plates is formed by a plate of glass bearing ion diffusion created waveguides.

6. An optoelectronic switch device according to claim 1, wherein each of the concentration and selection plates is formed by a plate of glass having ion diffusion created waveguides, and the integrated strip being applied to the side thereof with the photodiodes individually coupled to the first ends of the waveguides.

7. An optoelectronic switch device according to claim 1, wherein each of the distribution plates is made of silica-impregnated epoxy resin with embedded individual fibers constituting said waveguides.

8. An optoelectronic switch device according to claim 1, wherein each of the distribution plates is made of glass having embedded individual fibers constituting waveguides.

9. An optoelectronic switch device according to claim 1, wherein each of the concentration and selection plates is made of silica-impregnated epoxy resin having embedded individual optical fibers constituting said waveguides, the integrated strip being applied to the side thereof with the photodiodes individually coupled to the first ends of respective ones of said waveguides.

10. An optoelectronic switch device according to claim 1, wherein each of the concentration and selection plates is made of glass having embedded individual optical fibers constituting said waveguides, and the integrated strip being applied to the side thereof with the photodiodes individually coupled to the first ends of respective ones of said waveguides.

* * * * *